(12) United States Patent
Heuthorst et al.

(10) Patent No.: US 7,414,207 B2
(45) Date of Patent: Aug. 19, 2008

(54) NON-LOCKING SWITCH FOR FILTER MONITORING

(75) Inventors: Joseph P. Heuthorst, Waterloo, IA (US); Michael J. Lockert, Jr., Cedar Falls, IA (US); Charles H. Berry, III, Cedar Falls, IA (US)

(73) Assignee: Engineered Products Company, Waterloo, IA (US)

( * ) Notice: Subject to any disclaimer, the term of this patent is extended or adjusted under 35 U.S.C. 154(b) by 0 days.

(21) Appl. No.: 11/343,063

(22) Filed: Jan. 30, 2006

(65) Prior Publication Data

US 2006/0225993 A1 Oct. 12, 2006

Related U.S. Application Data

(60) Provisional application No. 60/648,169, filed on Jan. 28, 2005.

(51) Int. Cl.
*H01H 35/40* (2006.01)
(52) U.S. Cl. ..................... 200/83 J; 200/83 R
(58) Field of Classification Search ............... 200/83 R, 200/83 J, 61.2, 61.21, 61.6, 245, 246, 271, 200/283
See application file for complete search history.

(56) References Cited

U.S. PATENT DOCUMENTS

| | | | |
|---|---|---|---|
| 2,268,791 A | 1/1942 | Yule | |
| 3,066,527 A | 12/1962 | Stein | |
| 3,247,824 A | 4/1966 | Rodgers | |
| 3,258,960 A | 7/1966 | Baden | |
| 3,381,651 A | 5/1968 | McKinlay | |
| 3,388,682 A | 6/1968 | Whiting | |
| 3,397,395 A | 8/1968 | Pierce | |
| 3,443,365 A | 5/1969 | Lee | |
| 3,465,707 A | 9/1969 | Kashiwaba | |

(Continued)

FOREIGN PATENT DOCUMENTS

DE 3630430 10/1987

(Continued)

OTHER PUBLICATIONS

International Search Report and Written Opinion for PCT/US2006/003263, Jun. 2, 2006; 10 pages.

(Continued)

*Primary Examiner*—Elvin Enad
*Assistant Examiner*—Lisa Klaus
(74) *Attorney, Agent, or Firm*—Schwegman, Lundberg & Woessner, P.A.

(57) ABSTRACT

Commercially available filter-monitoring switches suffer from problems related to over sensitivity and reliability. Accordingly, the present inventors have devised, among other things, various embodiments of filter-monitoring switches and related components, subassemblies, methods, and systems. One exemplary filter-monitoring switch includes a diaphragm operably couple to move a conductive element back and forth between a pair of fixed terminals in response to pressure differences across the diaphragm. The conductive element is mounted to an insulative pin of substantially uniform width, and the terminals include leaf contacts that constantly engage the pin or the contacts throughout normal operation of the switch, thereby reducing flexure of the contacts and effectively providing a self-cleaning and self-healing electrical switch.

14 Claims, 5 Drawing Sheets
(3 of 5 Drawing Sheet(s) Filed in Color)

U.S. PATENT DOCUMENTS

| | | | |
|---|---|---|---|
| 3,556,043 A | | 1/1971 | Vayda |
| 3,718,790 A | * | 2/1973 | Zelenka .................... 200/83 V |
| 3,778,572 A | * | 12/1973 | Matsui et al. ......... 200/61.45 M |
| 3,815,816 A | * | 6/1974 | Scarelli ...................... 337/331 |
| 3,904,842 A | * | 9/1975 | Gauer ...................... 200/81 R |
| 3,916,817 A | | 11/1975 | Kemp |
| 3,922,909 A | | 12/1975 | Dixson et al. |
| 3,939,457 A | | 2/1976 | Nelson |
| 3,963,891 A | | 6/1976 | de Magondeaux |
| 4,029,041 A | | 6/1977 | Genshpring et al. |
| 4,033,733 A | | 7/1977 | Nelson |
| 4,142,503 A | | 3/1979 | Hatz et al. |
| 4,189,724 A | | 2/1980 | Onuma et al. |
| 4,211,901 A | * | 7/1980 | Matsuda et al. .......... 200/83 B |
| 4,215,254 A | * | 7/1980 | Ohki ....................... 200/83 C |
| 4,243,374 A | * | 1/1981 | Demi .......................... 431/89 |
| 4,254,731 A | | 3/1981 | Taylor |
| 4,255,630 A | * | 3/1981 | Hire et al. ................. 200/81.4 |
| 4,279,162 A | | 7/1981 | Neill et al. |
| 4,304,546 A | * | 12/1981 | Demi .......................... 431/72 |
| 4,342,978 A | * | 8/1982 | Meister ......................... 337/6 |
| 4,369,728 A | | 1/1983 | Nelson |
| 4,445,456 A | | 5/1984 | Nelson |
| 4,553,001 A | * | 11/1985 | Kroetsch ................. 200/61.41 |
| 4,688,511 A | | 8/1987 | Gerlach et al. |
| 5,461,208 A | * | 10/1995 | McKenna .................. 200/83 J |
| 5,538,185 A | * | 7/1996 | Rabitsch et al. ................ 239/76 |
| 5,616,157 A | | 4/1997 | Mead et al. |
| 5,774,056 A | | 6/1998 | Berry, III et al. |
| 5,850,183 A | | 12/1998 | Berry, III |
| 6,161,417 A | | 12/2000 | Nepsund |
| 6,268,791 B1 | | 7/2001 | Ferris |
| 6,289,726 B1 | | 9/2001 | Ferris et al. |
| 6,307,466 B1 | | 10/2001 | Ferris |
| 6,327,902 B1 | | 12/2001 | Berry, III et al. |
| 6,604,486 B1 | | 8/2003 | Krisko et al. |
| 2004/0089230 A1 | * | 5/2004 | Schwarz et al. ............. 118/300 |

FOREIGN PATENT DOCUMENTS

| | | |
|---|---|---|
| DE | 4315577 | 12/1993 |
| EP | 0044922 A1 | 2/1982 |
| FR | 2298097 | 8/1976 |
| FR | 2338395 | 8/1977 |
| WO | WO-2006/081564 A1 | 8/2006 |

OTHER PUBLICATIONS

"International Search Report for corresponding PCT Application No. PCT/US2006/003263", (Jun. 2, 2006), 2 pgs.

* cited by examiner

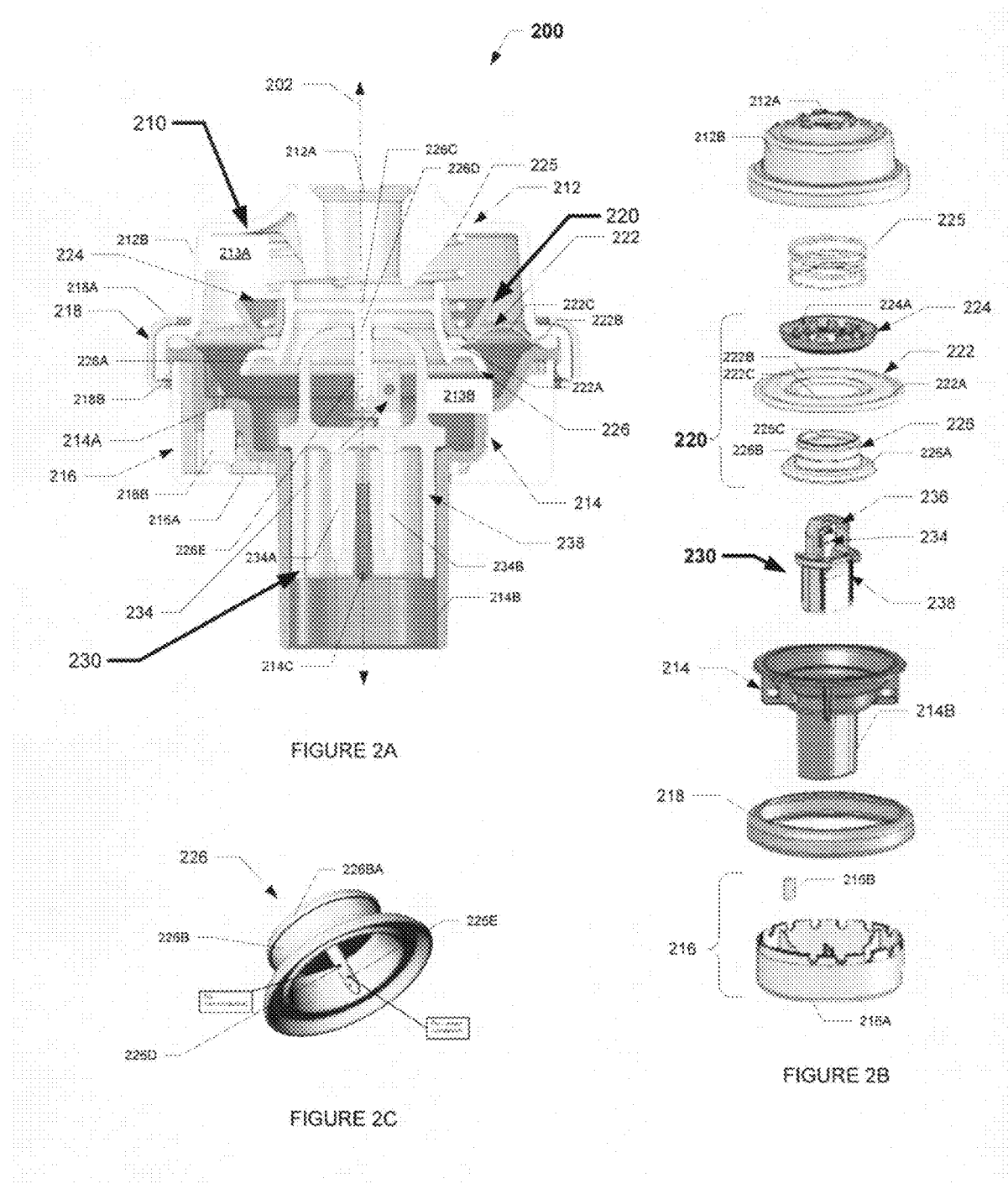

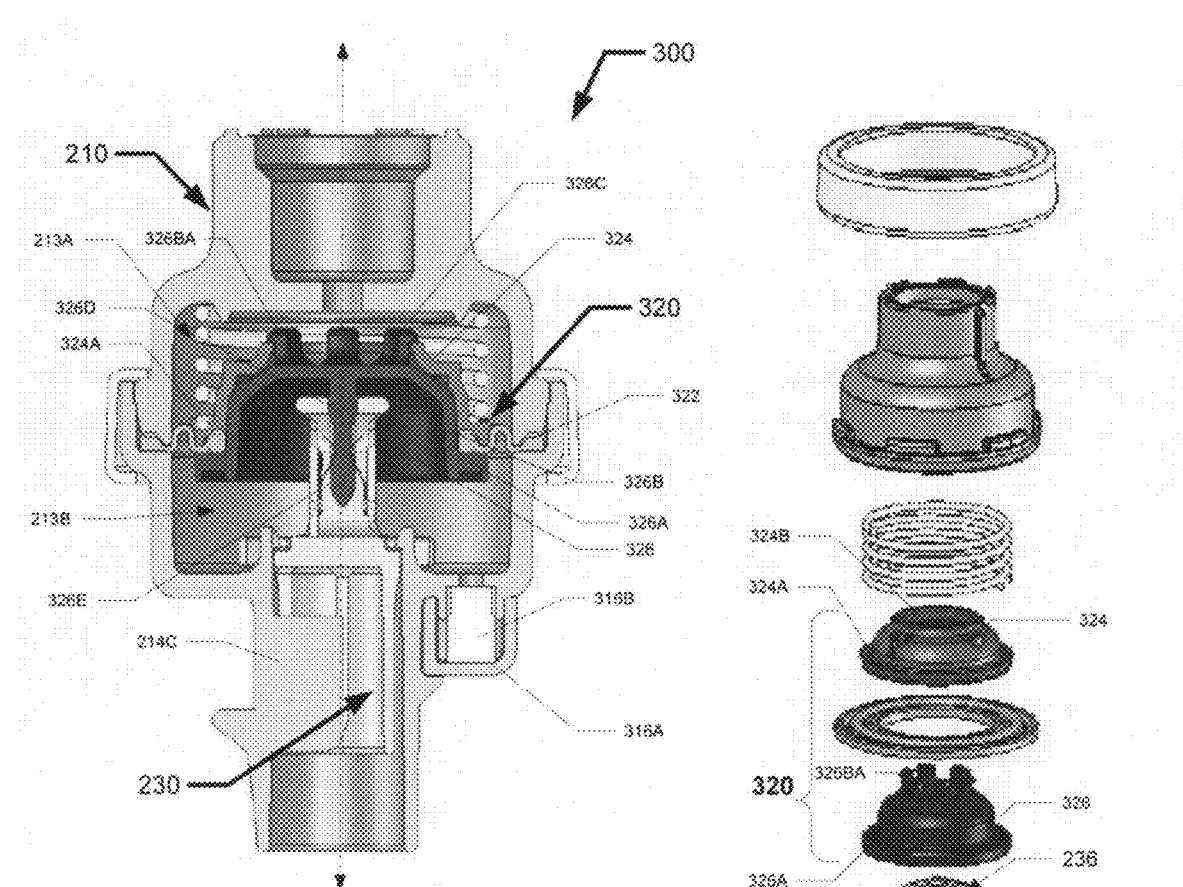
FIGURE 3A
FIGURE 3B
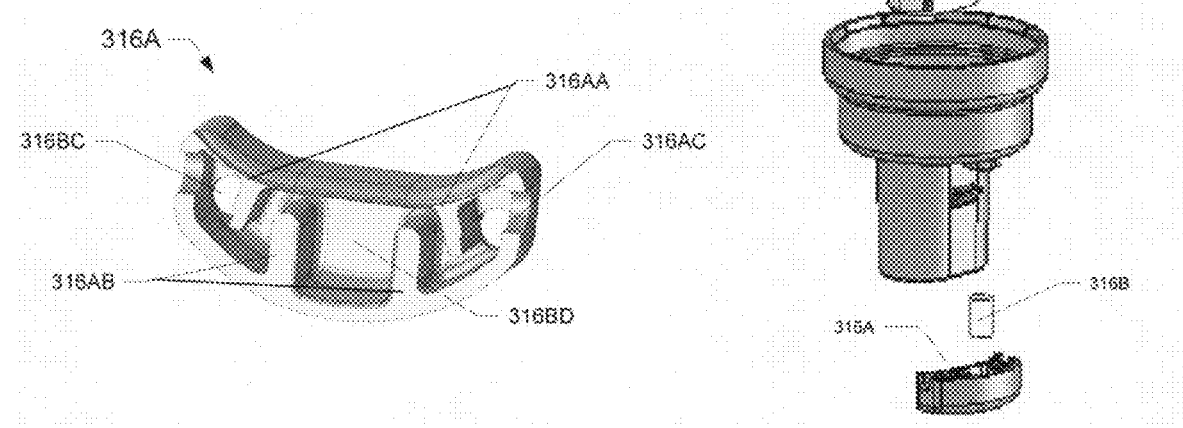
FIGURE 3C

NON-LOCKING SWITCH FOR FILTER MONITORING

RELATED APPLICATION

The present application claims the benefit under 35 U.S.C. 119(e) of U.S. Provisional Patent Application 60/648,169 which was filed on Jan. 28, 2005 and which is incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2005 Engineered Products Company, Inc.

TECHNICAL FIELD

Various embodiments of the present invention concern devices for monitoring fluid-filter performance, particularly devices that incorporate an electrical switch responsive to a differential pressure. Some embodiments of the invention may also be used in other applications.

BACKGROUND

Many modern systems include air or liquid filters to ensure proper or reliable performance. For example, automobiles include air and fuel filters to remove dirt and other particulates from the air and fuel that are mixed and then ignited within their internal combustion engines. As a consequence of their proper operation, these filters collect particulates over time and increasingly restrict the flow of air or fuel into engines. Eventually, the filters become more restrictive than desirable and require replacement.

To facilitate timely filter replacement, automobiles and other systems sometimes include filter-monitoring devices, which monitor pressure or vacuum levels that result from fluid flow through associated filters. These devices are calibrated to detect when particular pressure or vacuum conditions occur and to respond to such occurrences in particular ways. For example, some devices, referred to herein as filter-monitoring switches, open or close an electrical switch, which is typically wired to illuminate a warning light or to send a signal to an engine computer for further processing.

The present inventors have recognized that commercially available filter-monitoring switches suffer from at least three problems. First, some filter-monitoring switches are overly sensitive to spiking or fluttering pressures and thus prematurely signal filter replacement or provide a fluttering output signal that is difficult to process. Second, overly sensitive switches experience recurrent arcing between their electrical contacts that degrades performance, and often leads to premature failure of the switches. And, third, some switches allow dust and water intrusion that can also degrade performance and cause failures.

Accordingly, the present inventors have recognized a need to improve conventional filter-monitoring switches.

SUMMARY

To address this and/or other needs, the present inventors devised, among other things, various embodiments of filter-monitoring switches and related components, subassemblies, methods, and systems. One exemplary filter-monitoring switch includes a diaphragm, and a switch defined by a conductor, and a pair of terminal contacts. In operation, the diaphragm flexes in response to differences in pressures on its opposing sides and causes the conductor to move relative the pair of terminal contacts. Depending on initial position of the conductor and the differential pressure, movement of the conductor can make or break contact with the pair of terminals.

In one exemplary system, the diaphragm separates a chamber into two parts, one coupled to the atmosphere and the other to a fluid inlet of an internal combustion engine. The fluid inlet receives filtered air or fuel from a corresponding filter. As the filter becomes dirty or clogged with particulates, it increasingly restricts fluid flow through the inlet and increases the differential pressure on the diaphragm, eventually forcing movement that either opens or closes the switch. The switch is coupled to an electric circuit, which operates an indicator lamp or sends an electrical signal to a vehicle computer system.

In some embodiments, the portion of the chamber coupled to atmosphere includes a vent hole, a dust cover, and a Teflon filter. The Teflon filter, which is sandwiched between a region surrounding the vent hole and the dust cover, not only safeguards the switch from water and dust intrusion, but also dampens response of the switch to pressure changes.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIG. 2A is a cross-sectional view of an exemplary filter-monitoring switch 200, which corresponds to one or more embodiments of the invention.

FIG. 2B is an exploded perspective view of filter-monitoring switch 200.

FIG. 2C is a perspective view of an exemplary push plate which corresponds to one or more embodiments of the invention.

FIG. 3A is a cross-sectional view of an exemplary filter-monitoring switch 400, which corresponds to one or more embodiments of the invention.

FIG. 3B is an exploded perspective view of switch 400.

FIG. 3C is a perspective view of an exemplary dust cover which corresponds to one or more embodiments of the invention.

DETAILED DESCRIPTION OF EXEMPLARY EMBODIMENT(S)

This description, which incorporates the above-identified figures and appended claims, describes one or more specific inventive embodiments. These embodiments, offered not to limit but only to exemplify and teach one or more inventions, are shown and described in sufficient detail to enable those skilled in the art to implement or practice the invention(s). The description may use terms, such as upper or lower in reference to specific features of various as embodiments; however, unless included in the claims, such terms are merely to aid correlating the drawings with the written description. Moreover, where appropriate to avoid obscuring the invention(s), the description may omit certain information known to those of skill in the art.

Figure 1:
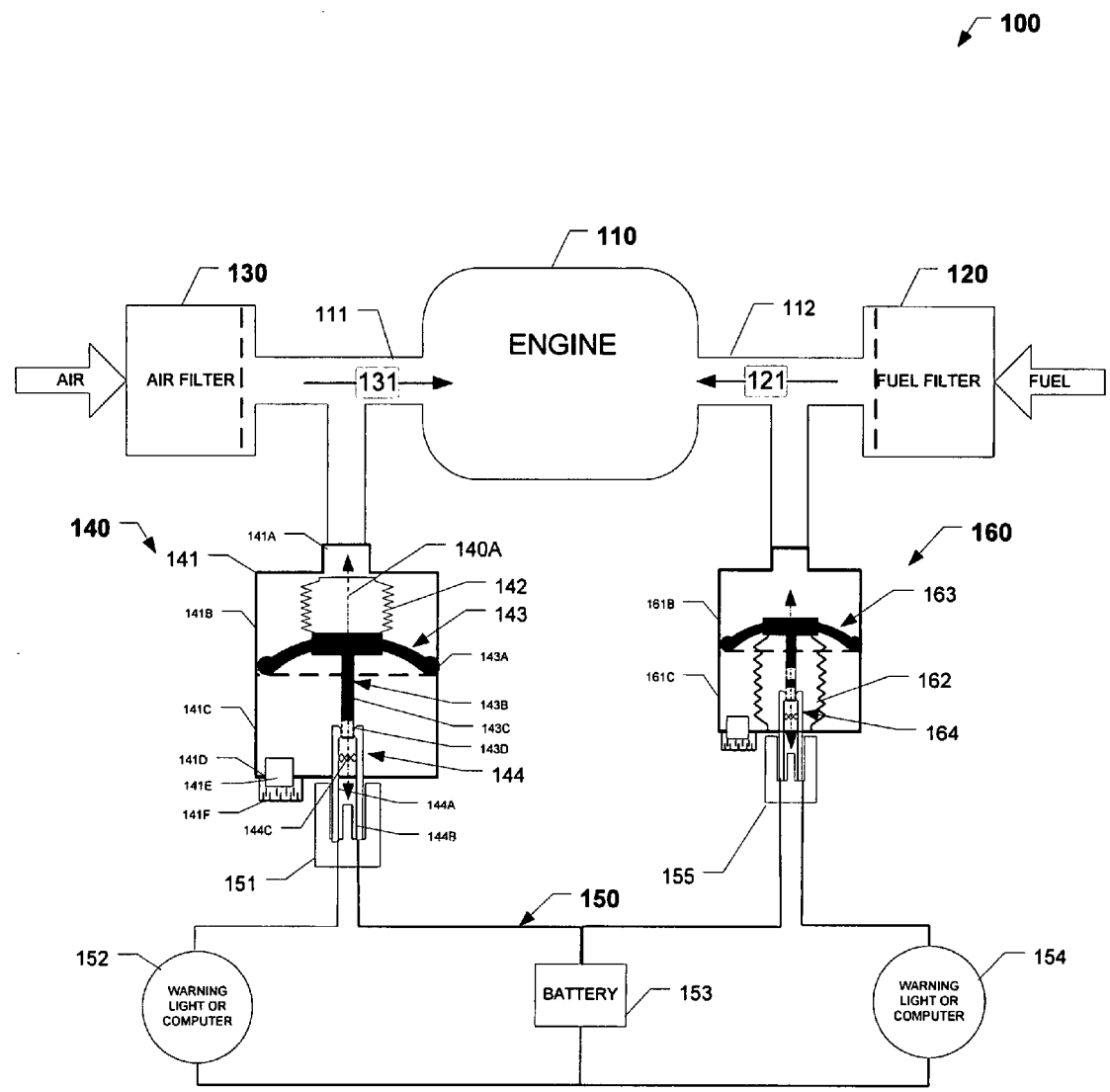
FIG. 1 is a block diagram of an exemplary engine system 100 which corresponds to one or more embodiments of the invention.

FIG. 1 shows a block diagram of an exemplary engine system 100 which incorporates teachings of the present invention. System 100 includes an engine 110, a air filter 120, a fuel filter 130, filter-monitoring switches 140 and 150, and monitoring circuitry 160 and 170.

Engine 110 includes an air inlet 111 and a fuel inlet 112 for respectively channeling air and fuel into engine 110 for combustion according to known principles. In the exemplary embodiment, engine 110 takes the form of an internal combustion engine; however, in some embodiments, engine 110 takes other forms.

Air filter 120 provides a filtered air flow 121 through air inlet 111 to engine 110. In the exemplary embodiment, air filter 120 takes any convenient or desirable form.

Fuel filter 130, which is in fluid communication with fuel inlet 112, provides a filtered fuel flow 131 through inlet 112 to engine 110. In the exemplary embodiment, air filter 130 takes any convenient or desirable form.

Filter-monitoring switch 140, which is sized for operation as "air switch" or filter-monitoring air switch, includes a chamber 141, a calibration spring 142, a diaphragm assembly 143, and a terminal assembly 144.

Chamber 141 includes an inlet portion 141A, and respective upper and lower chambers 141B and 141C. Inlet portion 141 provides fluid communication between upper chamber 141B and air inlet 112. Upper chamber 141B, in the exemplary embodiment, snap fits onto lower chamber 141B. Lower chamber 141C includes a breather hole 141D which allows fluid communication between the lower chamber and ambient atmosphere. Hole 141D is covered with a dust cover 141E and a fluid filter 141F. Dust cover 141F sandwiches fluid filter 141E between an interior surface of the dust cover and a region surrounding hole 141D. In the exemplary embodiment, fluid filter 141E consists essentially of a gas-permeable, water-repellant material, such as Porex IRM-0217 or XM-1484 (Teflon PTFE—Polytetrafluoroethylene). However, some embodiments form the material using other vinyl polymers or other materials made from the monomer tetrafluoroethylene. Still other embodiments use felt or other porous filter media.

Calibration spring 142 fits between an upper interior surface of the chamber and diaphragm assembly 143, biasing response of the diaphragm assembly to differential pressures between the upper and lower chambers 141B and 141C. Some embodiments may omit calibration spring 142.

Diaphragm assembly 143 includes a deflectable diaphragm 143A, and a pin assembly 143B. Diaphragm portion 143A, which includes a flexible and substantially fluid impervious membrane, provides a generally fluid-tight seal between upper and lower chambers 141B and 141C. ('Generally fluid-tight,' as used herein, refers to a seal that has a leakage rate low enough to not interfere with the operation of the diaphragm and the filter-monitoring switch.) Diaphragm portion 143A deflects or otherwise moves from a neutral position N to another position F in response to a differential pressure between the upper and lower chamber portions, thereby moving pin assembly 143B up or down along a central axis 140A.

Pin assembly 143B includes a non-conductive pin portion 143C and a conductive portion 143D. Non-conductive pin portion 143C extends orthogonally away from the diaphragm portion 143A into lower chamber 141C. Conductive portion 143D, which has substantially the same width or outer diameter as that of pin portion 143C, making it flush with the surface of pin portion 143C. Conductive portion 143D is mounted at a position on pin portion 143C to ensure contact with terminals 144A and 144B of terminal assembly 144 when diaphragm portion 143A is in its neutral (or relaxed state.) The exemplary embodiment forms conductive portion 143D as a cylindrical bushing of hard gold plated brass that encircles pin portion 143C.

Terminal assembly 144 (or switch assembly) includes terminals 144A and 144B and a bias element 144C. Terminals 144A and 144B are spaced apart a distance Y, which is less than nominal width X of pin assembly 143B. Bias element 144C generally represents means for biasing terminals 144A and 144B to apply a substantially constant force to the pin assembly as it moves between the terminals in response to differential pressures between the upper and lower chambers. Terminals 144A and 144B are electrically coupled to circuitry 150 via a two-terminal connector 151.

Circuitry 150 includes, in addition to connector 151, a warning lamp 152, a battery 153, a warning lamp 154, and a two-terminal connector 155. Warning lamp 152 and filter-monitoring switch 140 are coupled in series across battery 153, enabling switch 140 to activate or deactivate the lamp as diaphragm assembly 143 responds to differential pressure between upper and lower chambers 141B and 141C. (In some embodiments, the warning lamps are replaced with input port for a vehicle computing system, which includes a analog-to-digital converter.) Battery 153 is also coupled across the series connection of warning lamp 154 and connector 155, which itself is connected to filter-monitoring switch 160.

Filter-monitoring switch 160, which not only operates warning lamp 154 in a manner similar to filter-monitoring switch 140, but also has a similar structure arrangement, includes a chamber 161, a calibration spring 162, a diaphragm assembly 163, and a terminal assembly 164. Switch 160, however, is sized and constructed to operate as a "fuel switch." Additionally, in this exemplary embodiment, switch 160 is shown in a pressure configuration, with spring 162 positioned in a lower chamber 161C, rather than upper chamber 161B to counteract relative higher fluid pressures in upper chamber 161B. In contrast, switch 140 is shown in a vacuum configuration, with spring 142 positioned in upper chamber 141B to counterbalance the relatively higher atmospheric pressures in lower chamber 141C.

FIGS. 2A and 2B respectively show cross-sectional and perspective exploded views of an exemplary filter-monitoring switch 200. Switch 200 includes a housing assembly 210, a diaphragm assembly 220, and a switch module 230.

Housing assembly 210, which includes a housing 212, a cap 214, a filtration system 216, and a collar 218. In the exemplary embodiment, all components of the housing assembly, except for filter 216B and collar 218 are molded from Clariant Nylon 6/6 (13% Glass Filled.). Filter 216B is formed of Teflon PTFE, and collar 218 is formed of aluminum, with edge rolled down after assembly of the switch.

More particularly, housing 212, which in the exemplary embodiment has a generally cup-like structure, includes a fluid inlet 212A and a sidewall 212B. The height of sidewall 212B is selected to permit movement of diaphragm assembly 220. Housing 212 is attached to cap 214, for example via a snap fit, to form a chamber 213, having upper and lower chambers 213A and 213B analogous to chambers 141B and 141C in switch 140.

Cap 214, which is generally horn-shaped in the exemplary embodiment, includes a breather hole 214A, a stem portion 214B, and a rib portion 214C. Breather hole 214A is in fluid communication with ambient atmosphere through filtration system 216.

Filtration system 216 includes a dust cover 216A and filter 216B, with the dust cover adjacent an exterior portion of cap 214 sandwiching filter 216B. Air can enter the dust cover, and consequently the lower chamber, through one or more openings distributed in the sidewall of the cover.

Collar 218 encircles the interface between housing 212 and cap 214 to add further integrity and aesthetic appeal to the switch. Collar 218 includes upper and lower rolled edges 218A and 218B. Some embodiments omit collar 218.

Diaphragm assembly 220, which provides a generally fluid tight seal between upper and lower chambers 213A and 213B, includes a diaphragm 222, a retaining ring 224, and a push plate 226.

Diaphragm 222 includes an annular outer bead 222A and an inner annular bead 222B, which peripherally bound a convex annular portion 222C. Outer bead 222A is sandwiched between respective annular portion of the upper and lower chambers, more precisely housing 212 and cap 214. Inner annular bead 222B is sandwiched between retaining push plate 224 and retaining ring 226, which engage each other via a snap fit. The exemplary embodiment forms diaphragm 222 from silicon or other suitable material.

Retaining ring 224 includes an annular trough 224A which seats a lower portion of calibration spring 225. The spring can be selected to calibrate the diaphragm so as not to deflect until a threshold pressure, or pressure difference is reached within the inner cavity. (Notably, the design of the diaphragm assembly is flexible in allowing in some switches the calibration spring to be placed in the upper chamber between the housing and retaining ring, and in others to be placed in the lower chamber between the cap and the push plate.) Retaining ring 224 also secures and seals the diaphragm against an annular flange portion 226A of push plate 226.

Push plate 226, which is also shown in FIG. 2C as being generally a bell-shaped structure molded from Vydyne 22HSP Nylon, includes an annular wall portion 226B, a plate portion 226C, a pin portion 226D, and conductive bushing 226E. Annular wall portion 226B includes an upper ridge 226BA which together with annular flange portion facilitate the snap fit with retaining ring 226. Plate portion 226C is bounded by annular wall portion 226B, and positioned intermediate upper ridge portion 226BA and annular flange portion 226A. Analogous to pin portion 143B in FIG. 1, pin portion 226D extends orthogonally from a central region of plate portion 226C, with the lower end of the pin portion encircled by conductive bushing 226E. In one embodiment, conductive bushing is positioned closer to the end of the pin to define the switch as a normally open switch, and in another it is positioned further from the end of the pin to define a normally closed contact. The majority of the length of pin portion 226D extends through a guide hole 236C of terminal module 230.

Figure 2D:
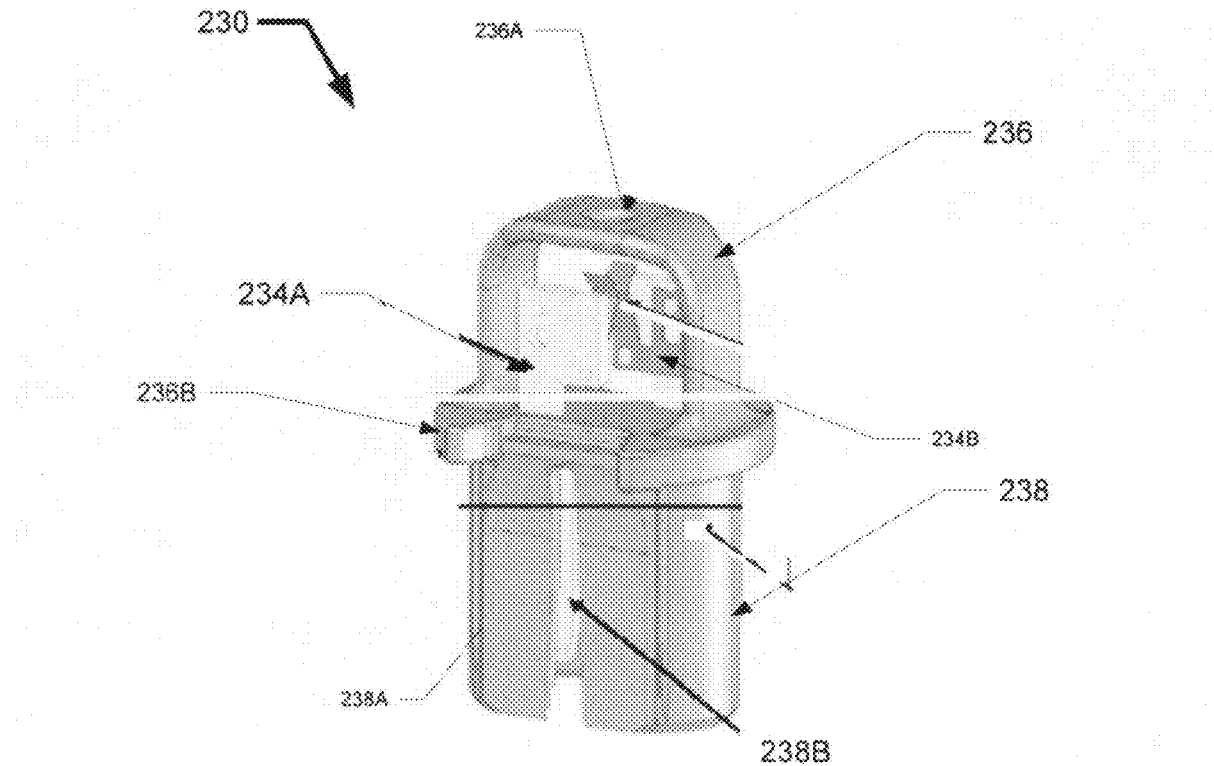
FIG. 2D is a perspective view of an exemplary module 300 which corresponds to one or more embodiments of the invention.
Figure 2E:
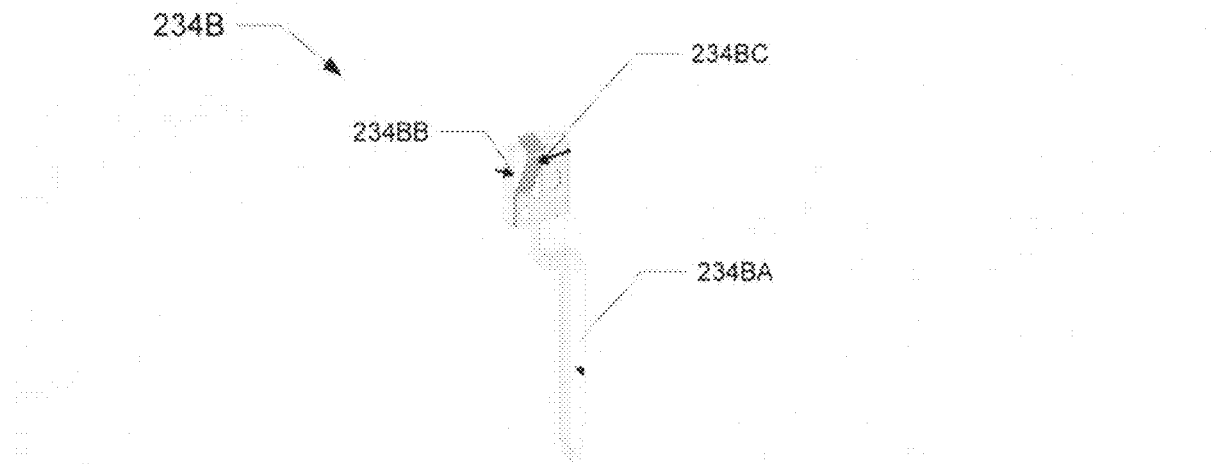
FIG. 2E is a perspective view of an exemplary terminal which corresponds to one or more embodiments of the invention.

Terminal module 230, shown also in FIGS. 2D and 2E, includes a terminal assembly 234 and upper and lower portions 236 and 238. Terminal assembly 234 includes a pair of substantially identical non-contacting terminals 234A and 234B. Shown best in FIG. 2D, terminal 234B includes a terminal pin 234BA, a terminal pad 234BB, and a leaf contact 234BC. Terminal pin 234BA, which is sized to engage or mate with a female connector (not shown), is formed of half-hardened brass and tin plated. Substantially covering terminal pad 234BB, leaf contact 234BC is formed of beryllium-copper and includes a spring portion 234BD. Insert-molded around terminal assembly 234 are upper and lower module portions 236 and 238.

In the exemplary embodiment, module portion 236 and 238 are formed of Vydyne Nylon 6/6 22 HSP. Upper portion 236 includes guide hole 236A and module support 236B. Lower portion 238 has a sleeve portion 238A with a notch 238B with the sleeve portion extending from the opposite side of the module support as upper portion 236A. Notch 238B extends along the length of the sleeve portion and engages with rib 214C in the stem portion of cap 214 to ensure alignment of guide hole 236A with central axis 202A and pin 226D and to provide additional rigidity. The module support is sealed around the prongs (terminals) to prevent contaminants from entering into the lower chamber.

In the exemplary embodiment, the terminal-module-to-cap interface is not fluid tight; however, a suitable connector adapted to fit within the stem portion of cap 214 can seal this portion of the cap and restrict breathing of the lower chamber to filtration system 216. The module structure is also attached to the cap, and the module structure does not move with respect to the housing assembly.

FIGS. 3A, 3B, and 3C respectively show cross-sectional and perspective exploded views of an exemplary filter-monitoring switch 300, which is structurally and functionally similar to switch 200, with the exception that switch 300 is intended for use in smaller spaces and greater differential pressures than switch 200 and includes a different dust cover 316A and a different diaphragm assembly 320.

Filtration system 316 includes a dust cover 316A and a filter 316B, with the dust cover and an adjacent exterior portion of cap 314 sandwiching filter 316B. FIG. 3C, an underside perspective view of dust cover 316A, reveals interleaved ribs 316AA and 316AB and openings 316BC. Interleaved ribs 316AA and 316AB provide a maze-type barrier between openings 316BC and a cavity 316BD that receives an upper portion of filter 316B.

Diaphragm assembly 320, which provides a generally fluid tight seal between upper and lower chambers 213A and 213B, includes a diaphragm 322, a retaining ring 324, and a push plate 326.

Retaining ring 324, which is generally dome shaped, includes an annular flange 324A which seats a lower portion of the calibration spring and upper hole 324B. Retaining ring 324 also secures and seals the diaphragm against an annular flange portion 326A of push plate 326. Push plate 326 is also dome shaped and includes an annular wall portion 326B, a plate portion 326C, a pin portion 326D, and conductive bushing 326E. Annular wall portion 326B includes upper snaps 326BA and a lower flange 326BB which respectively engage upper hole 324B in a snap fit arrangement, thereby securely sandwiching an inner bead of diaphragm 322 between the lower flanges of the retainer ring and the push plate. Pin portion 326D extends orthogonally from a central region of plate portion 326C, with the lower end of the pin portion encircled by conductive bushing 326E.

Figure 4:
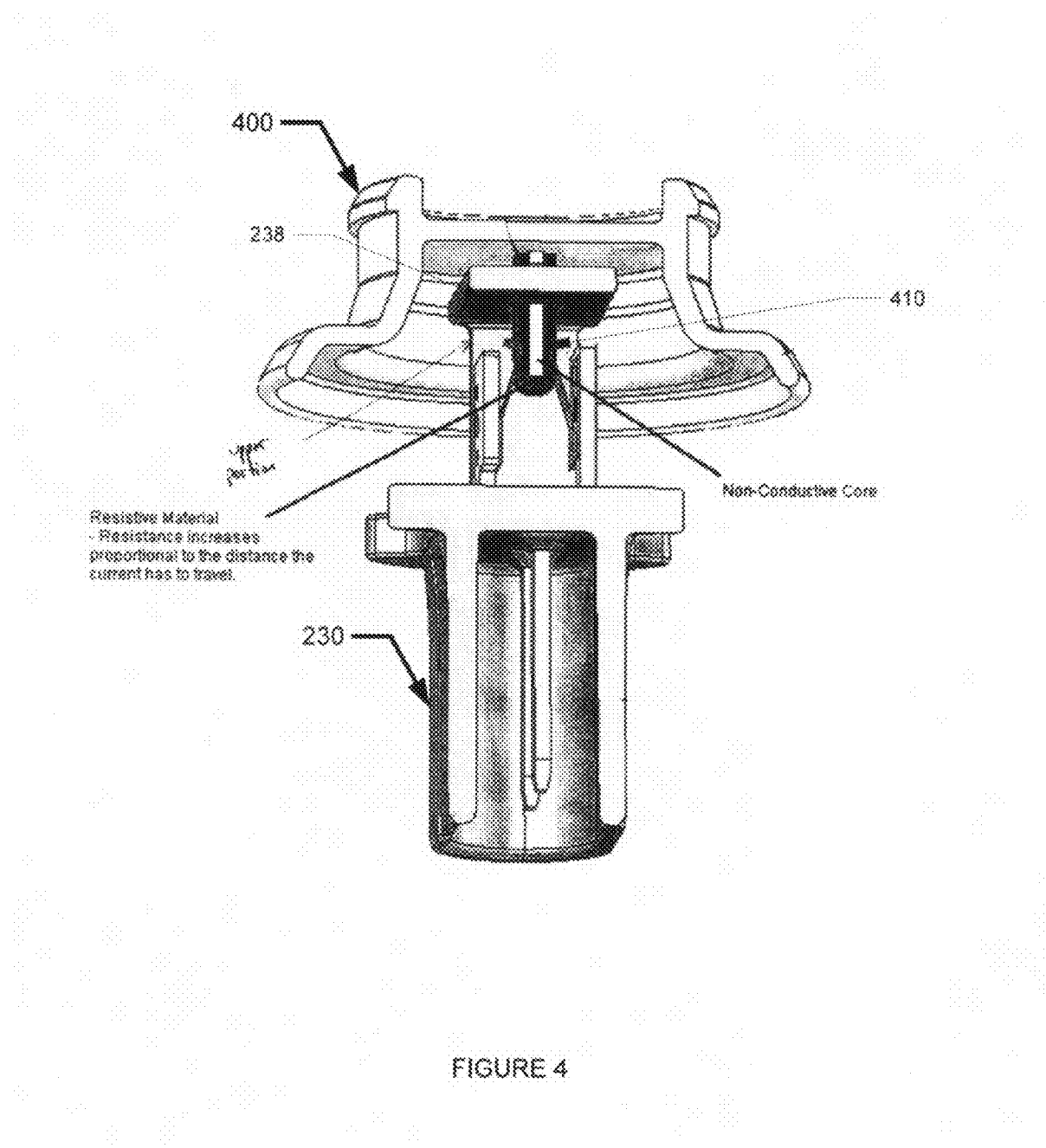
FIG. 4 is a cross-sectional view of an exemplary filtering monitoring device 400, which corresponds to one or more embodiments of the invention.

FIG. 4 shows a cross-sectional view of an alternative push plate 400, which may be substituted for the push plates of switches 140, 200, and 300 to reconfigure those switches as variable pressure sensors. Push plate 400, which is shown engaged with terminal module 230, includes a pin portion 410 which extends orthogonally from a central region of plate portion 226C, with the pin covered by a U-shaped resistive structure 412 that leaves a portion of the insulative pin exposed. As the push plate structure is moved up and down relative to the leaf contacts, the resistive structure and the leaf contacts are in contact and the length of the resistive material that conducts a current changes in proportion to the displacement of the push plate, thereby providing a current or voltage that varies in a predictable or substantially linear fashion. The majority of the length of pin portion 410 extends through guide hole 238C of terminal module 230.

Other embodiments based on this variable-resistance principle distribute a plurality of spaced-apart conductive segments or portions along the pin. As the pin moves through its range of motion, different conductive portions can contact the leaf assemblies. The different conductive segments can be selected to have different resistances. Thus, as the pin travels through its range of motion, the different resistances modulate the electrical signal passed between the leaf assemblies, effectively encoding the electrical signal with a measure of the diaphragm displacement, which in turn can be appropriately translated into a differential pressure across the diaphragm.

The switch can be configured for use in a pressure, vacuum, or differential pressure mode. In addition, the switch can be configured to be normally open or closed, or in "closed but variable resistance mode," or the like. In one example, the operating range of switch where the filtered fluid is air is between 13 to 30 inches of water. In another example, the operating range of the switch where the filtered fluid is a liquid is typically between 3 to 13 inches of mercury. Other calibrations are possible.

ADVANTAGES OF VARIOUS EMBODIMENTS

Various embodiments of the invention are believed to provide one or more of the following advantages. For examples, some embodiments exhibit improved damping characteristics in response to pressure spikes and pulsing that can lead to premature signaling and fluctuating signals. Damping is achieved in part by using a large deflectable diaphragm and a large inner cavity volume. These two properties slow the response time and minimize or reduce the force-to-friction ratio in the switches. The large size and calibration spring prevent the switch from moving until the pressure gradient is close to the selected level. Various embodiments has also shown an ability to function properly in temperature extremes (between −40 and 230 degrees F.) and under vibration (between 20 to 200 Hz and 4 g).

Some embodiments are less likely to experience intrusion of dust and water or other contaminants that could otherwise interfere with normal operation. The housing assembly in one or more of the embodiments includes three components—the housing, the cap, and the dust cover, which collectively or individually reduce the amount of liquid or debris intrusion. The tortuous or maze-like channels dissipate the energy of any stream of contaminants. Drain holes are included to vent or remove contaminants. The use of obstructions, tortuous channels absorb and disperse the energy of potentially intrusive fluid streams, and drainage holes allow contaminants to drain away. Additionally, the small water-repellant filter provides an additional barrier against contaminants.

Some embodiments may also provide additional benefits. For example some embodiments are relatively insensitive to switch orientation as a result of the light weight of the moving switch components. Some embodiments have a relatively low and substantially constant switch-contact force, which results in reduced hysterisis. Moreover, the wiping action of the push-plate pin against the leaf contacts creates a self-cleaning, self-healing switch.

CONCLUSION

In furtherance of the art, the present inventors have presented various filter-monitoring devices, components and related systems. The foregoing description and examples have been given for clarity of understanding only. Those skilled in the art will recognize that many changes can be made in the described examples without departing from the scope of this disclosure. Accordingly, the appropriate scope of this disclosure extends beyond the described examples.

The invention claimed is:

1. A filter-monitoring switch comprising:
   first and second contacts for connection to an electric circuit;
   a conductive member for electrically coupling the first contact to the second contact;
   a diaphragm coupled to move the conductive member; and
   a push plate coupled to the diaphragm and having a central pin coupled to the conductive member.

2. The switch of claim 1, further comprising a guide structure having a hole through which the central pin extends, the guide structure fixed relative to the first and second contacts to guide movement of the central pin along an axis between the first and second contacts.

3. The switch of claim 2, wherein the terminal support structure includes a sleeve around the first and second terminals, with the shroud including a notch generally parallel to the first and second terminal.

4. The switch of claim 1, wherein the conductive member is cylindrical and encircles a portion of the central pin.

5. The switch of claim 1, further comprising first and second terminals that are electrically and mechanically coupled respectively to the first and second contacts; and
   a terminal support structure that is insert-molded around the first and second terminals.

6. The switch of claim 1, wherein each of the first and second contacts includes a leaf contact biased toward the conductive member.

7. The switch of claim 1, further comprising a Teflon filter and a cover.

8. The switch of claim 1, wherein the push plate includes a cylindrical portion having a closed end and an open end, with the central pin extending from the closed end toward the open end, and the open end having an annular flange portion.

9. The switch of claim 1, further comprising a switch housing having an first and second snap-together portions, with the diaphragm having an annular outer portion and an annular inner portion, with the annular outer portion sandwiched between the first and second snap-together portions and an annular inner portion surrounding the cylindrical portion of the push plate.

10. The switch of claim 9, further comprising a retainer ring surrounding the cylindrical portion of the push plate and retaining the annular inner portion of the diaphragm against the annular flange portion of the push plate.

11. The switch of claim 1:
wherein the first and second contacts are biased against the central pin; and
wherein the central pin is non-conductive and has a nominal width and the conductive member has a nominal width that is substantially equal to the nominal width of the central pin, thereby providing a switch-contact force between the contacts and the central pin that is substantially equal to a switch-contact force between the contacts and the conductive member.

12. The switch of claim 1, further comprising means for self-cleaning the first and second contacts as the conductive portion moves relative the first and second contacts.

13. The switch of claim 1:
wherein the first and second contacts are mounted within a separate terminal module having terminals coupled to the contacts; and
wherein the switch further comprises a housing having an upper portion for coupling to a fluid inlet of an engine and a lower portion which snaps together with the upper portion to secure the diaphragm, the lower portion defining a socket surrounding the terminal module.

14. The switch of claim 1, wherein the switch is non-locking.

* * * * *